(12) United States Patent
Yamamoto et al.

(10) Patent No.: US 9,054,508 B2
(45) Date of Patent: Jun. 9, 2015

(54) ELECTRICAL JUNCTION BOX

(71) Applicant: Yazaki Corporation, Tokyo (JP)

(72) Inventors: Masaki Yamamoto, Makinohara (JP); Kazutoshi Kurachi, Makinohara (JP); Kei Tomita, Makinohara (JP)

(73) Assignee: Yazaki Corporation, Tokyo (JP)

( * ) Notice: Subject to any disclaimer, the term of this patent is extended or adjusted under 35 U.S.C. 154(b) by 99 days.

(21) Appl. No.: 14/017,661

(22) Filed: Sep. 4, 2013

(65) Prior Publication Data

US 2014/0060877 A1 Mar. 6, 2014

(30) Foreign Application Priority Data

Sep. 5, 2012 (JP) ................................. 2012-195111

(51) Int. Cl.
*H02G 3/08* (2006.01)
*H01R 13/11* (2006.01)
*H01R 11/32* (2006.01)

(52) U.S. Cl.
CPC ............... *H02G 3/08* (2013.01); *H01R 13/113* (2013.01); *H01R 11/32* (2013.01); *H01R 2201/26* (2013.01)

(58) Field of Classification Search
USPC ............................... 174/50; 439/535; 248/906
See application file for complete search history.

(56) References Cited

U.S. PATENT DOCUMENTS 5,674,090 A * 10/1997 Sumida et al. ............. 439/540.1
5,928,004 A * 7/1999 Sumida et al. ............... 439/76.2

FOREIGN PATENT DOCUMENTS

JP 4-52392 U 5/1992

\* cited by examiner

*Primary Examiner* — Dhirubhai R Patel
(74) *Attorney, Agent, or Firm* — Locke Lord LLP; James E. Armstrong, IV; Brian S. Matross

(57) ABSTRACT

An electrical junction box includes a frame, a bus bar and a relay to be mounted to the frame, a junction terminal interconnecting a plate-like terminal portion of the bus bar and a plate-like terminal portion of the relay. The junction terminal includes a tubular portion having a pair of opposing walls and a spring portion arranged in the tubular portion such that the plate-like terminal portion of the bus bar inserted into the tubular portion from one side is sandwiched between the spring portion and one opposing wall and the plate-like terminal portion of the electronic component inserted into the tubular portion from the other side is sandwiched between the spring portion and the other opposing wall. The frame includes a receiving portion allowing the junction terminal to enter only when it is in correct position and an engagement portion holding the junction terminal inserted into the receiving portion.

6 Claims, 9 Drawing Sheets

FIG. 4A
FIG. 4B
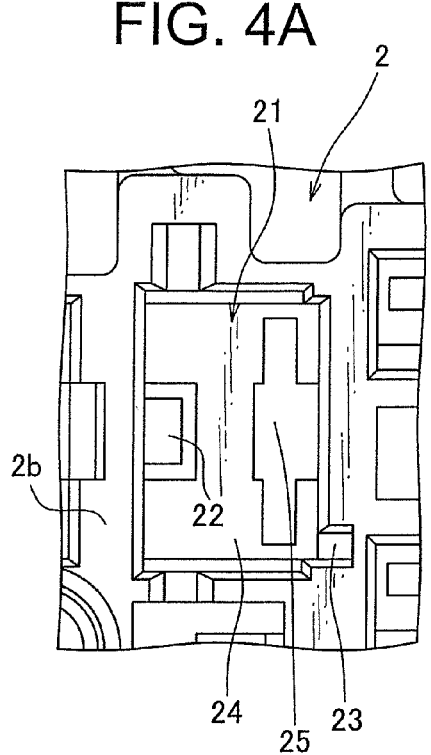
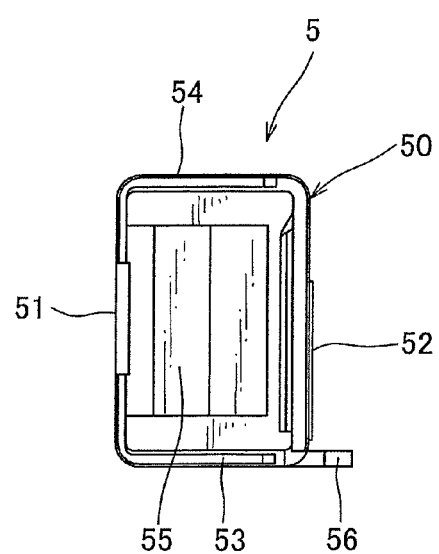

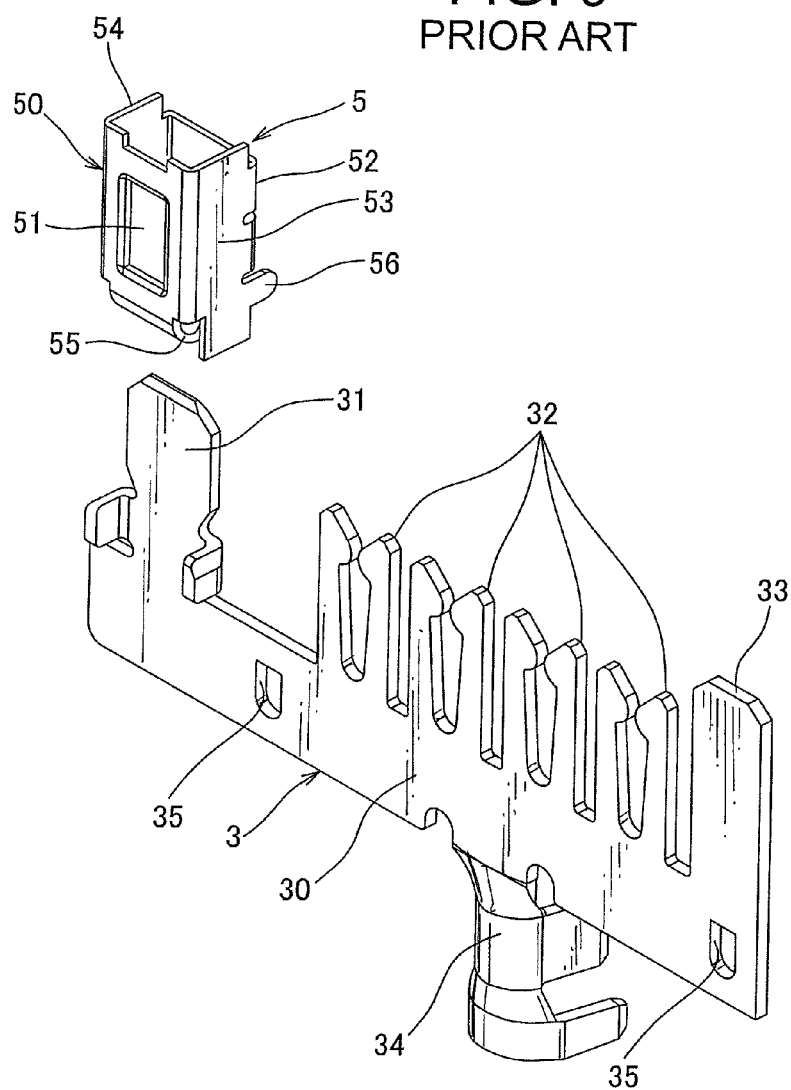

ELECTRICAL JUNCTION BOX

CROSS-REFERENCE TO RELATED APPLICATIONS

This application claims priority from Japanese Patent Application No. 2012-19511 filed on Sep. 5, 2012.

TECHNICAL FIELD

The present invention relates to an electrical junction box including a frame, a bus bar and an electronic component mounted to the frame, and a junction terminal interconnecting a plate-like terminal portion of the bus bar and a plate-like terminal portion of the electronic component.

BACKGROUND ART

An electrical junction box for a motor vehicle has various structures. One example of such electrical junction box is shown in FIG. 5 and includes a bus bar 3, a junction terminal 9, an electronic component which is electrically-connected to the bus bar 3 via the junction terminal 9, and a frame made of synthetic resin and mounted with these components (refer to PTL 1).

The bus bar 3 is obtained by pressing a metal plate and includes a laterally-extending flat plate portion 30, a plate-like connection portion 31, a plurality of U-shaped terminal portions 32 and a terminal protection portion 33 projecting from one end of the flat plate portion 30 in a short-side direction, and an electric wire crimp portion 34 projecting from the other end of the flat plate portion 30 in the short-side direction. The flat plate portion 30 is provided with a locking hole 35 at which a locking portion provided to the frame is locked.

The junction terminal 9 is obtained by pressing a metal plate and includes a first connection portion 91 into which the plate-like connection portion 31 of the bus bar is inserted and electrically-connected, and a second connection portion 92 to which the plate-like terminal portion of the electronic component is inserted and electrically-connected.

The first connection portion 91 is constituted of a rectangular plate-like bottom wall 90, and a spring portion 93 extending perpendicularly from both widthwise ends of the bottom wall 90 and having a tip bent towards the bottom wall 90. The plate-like connection portion 31 of the bus bar 3 is inserted between the bottom wall 90 and the spring portion 93 from an opposite side of the second connection portion 92 and pushed toward the bottom wall 90 by the spring portion 93.

The second connection portion 92 is constituted of a tubular portion 94 having the bottom wall 90 as one face, and a spring portion 95 arranged within the tubular portion 94. The plate-like terminal portion of the electronic component is inserted into the tubular portion 94 from the opposite side of the first connections portion and pushed towards the bottom wall 90 by the spring portion 95.

When assembling the electrical junction box including the above-described components, the junction terminal 9 is attached to the plate-like connection portion 31 of the bus bar 3 in advance, as shown in FIG. 5, and these bus bar 3 and the junction terminal 9 are inserted into the frame, and then the electronic component is mounted to the frame and the plate-like terminal portion of this electronic component is inserted into the tubular portion 94 of the junction terminal 9.

For the conventional electrical junction box described above, the junction terminal 9 which is attached to the bus bar 3 is inserted into the frame. Thus, the frame is not provided with an engagement lance, for example, to hold the junction terminal 9.

The junction terminal 9 shown in FIG. 5 is configured such that the first connection portion 91 and the second connection portion 92 are aligned along a height direction of the frame. Thus, the electrical junction box including such junction terminal 9 has a drawback that the height dimension of the frame is increased.

Other than the junction terminal 9 described above, a junction terminal 5 shown in FIG. 6 is known. This junction terminal 5 is obtained by pressing a metal plate and includes a tubular portion 50 having a pair of opposing walls 51, 52 and a pair of opposing walls 53, 54, a spring portion 55 arranged within the tubular portion 50, and a preventive projection 56 for preventing wrong insertion projecting from an outer surface of the tubular portion 50.

In case of using the junction terminal 5 instead of the junction terminal 9, as shown in FIG. 7, one spring portion 55 is arranged such that the plate-like connection portion 31 of the bus bar 3 inserted into the tubular portion 50 from one side is sandwiched between the spring portion 55 and one opposing wall 51 and that a plate-like terminal portion 41 of an electronic component 4 inserted into the tubular portion 50 from the other side is sandwiched between the spring portion 55 and the other opposing wall 52. The electronic component 4 shown in the drawing is a relay including a rectangular body portion 40 and a plurality of plate-like terminal portions 41 projecting from the body portion 40.

As described above, the junction terminal 5 is configured to push, with one spring portion 55, both of the plate-like connection portion 31 of the bus bar 3 and the plate-like terminal portion 41 of the electronic component 4. Thus, in the case of using such junction terminal 5 in the electrical junction box, the height dimension of the frame can be downsized compared to the case of using the above-mentioned junction terminal 9.

CITATION LIST

Patent Literature

PTL 1: Japan Utility Model Application Publication No. H4-52392

SUMMARY OF INVENTION

Problem to be Solved

However, in the case where the junction terminal 5 shown in FIGS. 6 and 7 is applied to the electrical junction box, there are two problems as described below.

First problem is that, when assembling the electrical junction box, the junction terminal 5 is attached to the bus bar 3 in advance, as shown in FIG. 6, and these junction terminal 5 and the bus bar 3 are inserted into the frame first, and after that the electronic component 4 is mounted to the frame. Thus, in this assembling procedure, there is possibility that the junction terminal 5 is detached from the bus bar 3 before inserting the bus bar 3 and the junction terminal 5 into the frame. This is because the junction terminal 5 is designed to ensure sufficient holding force when both of the plate-like connection portion 31 and the plate-like terminal portion 41 are inserted into the tubular portion 50. Due to this problem, it is not practical to use the junction terminal 5 in the electrical junction box.

Second problem is that, the junction terminal 5 can be attached to the plate-like connection portion 31 of the bus bar 3 even if the junction terminal 5 is in the wrong position such as upside down or front-side back, as shown in FIGS. 8 and 9. When the junction terminal 5 is attached to the plate-like connection portion 31 in the wrong position, this bus bar 3 and the junction terminal 5 cannot be inserted into the frame because the preventive projection 56 is caught by and interfered with the frame. When this happens, the junction terminal 5 must be detached and attached again. FIG. 8 shows the case in which the junction terminal 5 is attached to the bus bar 3 in the correct position, and FIG. 9 shows the case in which the junction terminal 5 is attached to the bus bar 3 in the wrong position.

The present invention aims to solve the above-mentioned problems. Thus, an object of the present invention is to provide an electrical junction box which can reduce the height dimension of the frame, and to provide an electrical junction box which can reduce the height dimension of the frame while preventing the wrong attachment of a junction terminal and a bus bar to enhance the assembling of the electrical junction box.

Solution to Problem

In order to achieve the above-described object, the present invention provides, in a first aspect, an electrical junction box including: a frame; a bus bar and an electronic component to be attached to the frame; and a junction terminal interconnecting a plate-like terminal portion of the bus bar and a plate-like terminal portion of the electronic component, wherein the junction terminal includes a tubular portion having a pair of opposing walls and a spring portion arranged in the tubular portion, wherein the spring portion is arranged such that the plate-like terminal portion of the bus bar inserted into the tubular portion from one side is sandwiched between the spring portion and one of the opposing walls and that the plate-like terminal portion of the electronic component inserted into the tubular portion from the other side is sandwiched between the spring portion and the other one of the opposing walls, and wherein the frame includes a receiving portion and an engagement portion arranged to hold the junction terminal inserted into the receiving portion.

In order to achieve the above-described object, the present invention provides, in a second aspect, the electrical junction box described above assembled by inserting the junction terminal alone into the receiving portion, and then attaching the bus bar and the electronic component to the frame, and inserting the plate-like terminal portion of the bus bar and the plate-like terminal portion of the electronic component into the tubular portion.

In order to achieve the above-described object, the present invention provides, in a third aspect, the electrical junction box described above, wherein the receiving portion allows the junction terminal to enter only when the junction terminal is inserted in a predetermined position.

In order to achieve the above-described object, the present invention provides, in a fourth aspect, the electrical junction box described above, wherein the junction terminal is provided with a preventive projection for preventing wrong insertion which projects from an outer surface of the tubular portion, and the receiving portion is provided with a preventive groove for preventing wrong insertion which positions the preventive projection.

Advantageous Effects of Invention

As explained above, according to the invention described in the first aspect, the junction terminal includes a tubular portion having a pair of opposing walls and a spring portion arranged in the tubular portion, and the spring portion is arranged such that the plate-like terminal portion of the bus bar inserted into the tubular portion from one side is sandwiched between the spring portion and one of the opposing walls and that the plate-like terminal portion of the electronic component inserted into the tubular portion from the other side is sandwiched between the spring portion and the other one of the opposing walls, and the frame includes a receiving portion and an engagement portion arranged to hold the junction terminal inserted into the receiving portion. Thus, the height dimension of the frame of the electrical junction box can be reduced.

As explained above, according to the invention described in the second aspect, the junction terminal alone is inserted into the receiving portion, and then the bus bar and the electronic component are attached to the frame, and the plate-like terminal portion of the bus bar and the plate-like terminal portion of the electronic component are inserted into the tubular portion to be assembled, thereby preventing the detachment of the junction terminal from the bus bar as is the case for inserting the junction terminal together with the bus bar attached to the junction terminal.

As explained above, according to the invention described in the third aspect, the receiving portion allows the junction terminal to enter only when the junction terminal is inserted in a predetermined position, thereby eliminating the possibility of inserting the junction terminal in the wrong position. Thus, by inserting the junction terminal alone into the receiving portion first followed by attaching the bus bar to the frame and inserting the plate-like terminal portion of the bus bar into the tubular portion of the junction terminal, improper attachment of the junction terminal and the bus bar can be prevented, thereby providing the electrical junction box which can be assembled easily.

As explained above, according to the invention described in the fourth aspect, the junction terminal is provided with a preventive projection for preventing wrong insertion which projects from an outer surface of the tubular portion, and the receiving portion is provided with a preventive groove for preventing wrong insertion which positions the preventive projection. Thus, the improper insertion of the junction terminal can be prevented with a simple structure.

BRIEF DESCRIPTION OF DRAWINGS

FIG. 4A is a bottom view of a portion of the frame shown in FIG. 2;

FIG. 4B is a bottom of the junction terminal shown in FIG. 2;

FIG. 9 illustrates possible problem of using the junction terminal shown in FIG. 6 and shows the junction terminal being attached to the bus bar in a wrong position

DESCRIPTION OF EXEMPLARY EMBODIMENTS

In the following, an electrical junction box according to one embodiment of the present invention is explained in reference to FIGS. 1-4. The electrical junction box is mounted to a motor vehicle and arranged to supply power and transmit signal to an electronic equipment mounted on the motor vehicle. In the present invention, the term "electrical junction box" may include a junction block (or a junction box), a fuse block (or a fuse box), and a relay block (or a relay box).

Figure 1:
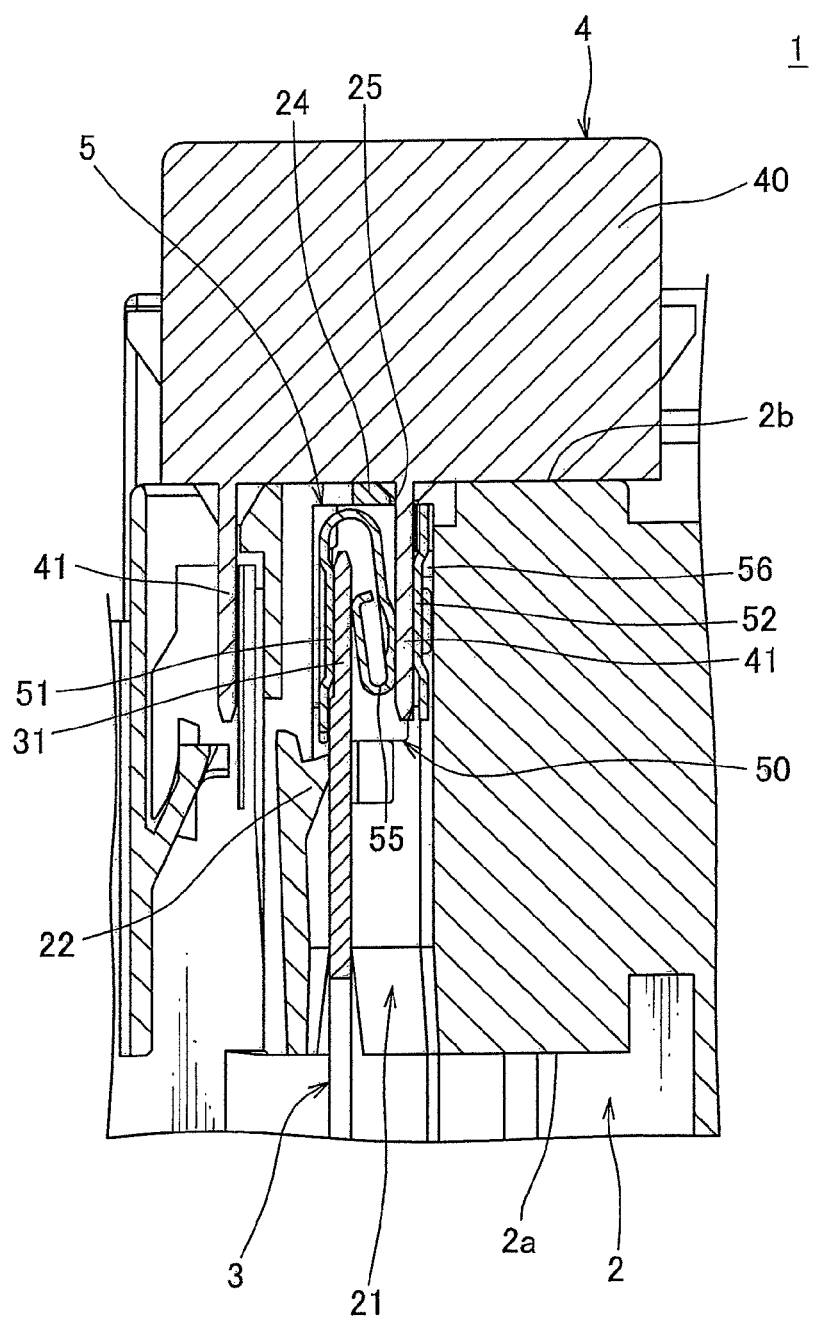
FIG. 1 is a cross-sectional view of an electrical junction box according to one embodiment of the present invention.

An electrical junction box 1 shown in FIG. 1 includes a frame 2 made of synthetic resin, a bus bar 3 to be attached to a frame 2, a plurality of electronic components such as a relay 4 and a fuse to be attached to the frame 2, and a junction terminal 5 interconnecting a plate-like terminal portion 31 of the bus bar 3 and a plate-like terminal portion 41 of the relay 4. The bus bar 3, the relay 4 and the junction terminal 5 are similar to the ones explained above.

Figure 2:
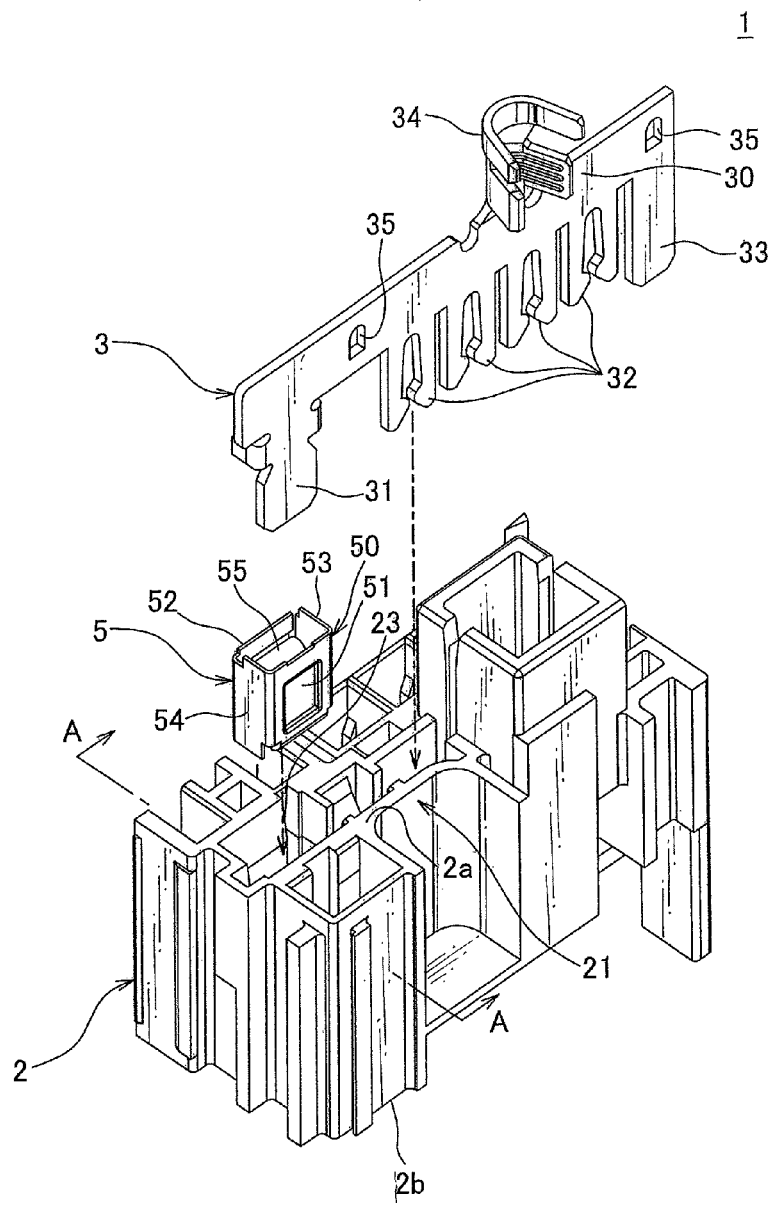
FIG. 2 illustrates an assembling method of the electrical junction box shown in FIG. 1.

The frame 2 may include a receive portion 21 receiving the bus bar 3 and the junction terminal 5, an engagement lance 22 holding the junction terminal 5 inserted into the receiving portion 21, and a component attachment portion to which the plurality of electronic components such as the relay 4 and a fuse is attached. The component attachment portion to which the relay 4 is attached is provided at the side of an upper face 2b of the receiving portion 21. Thus, when the relay 4 is attached to the component attachment portion, the plate-like terminal portion 41 is positioned in the receiving portion 21. The term "upper face 2b" means an upper face of the frame 2, and a reference sign "2a" is indicative of a lower face of the frame 2. In FIG. 2, a portion of the frame 2 is shown.

The receiving portion 21 extends in an up-down direction of the frame 2 with the side of the lower face 2a being opened. The receiving portion 21 includes an upper wall 24 provided on the side of the upper face 2b. The upper wall 24 includes an insertion hole 25 through which the plate-like terminal portion 41 of the relay 4 is passed. Furthermore, as shown in FIG. 4, the receiving portion 21 includes a preventive groove 23 for preventing wrong insertion for positioning a preventive projection 56 for preventing wrong insertion formed at the junction terminal 5. Thus, the receiving portion 21 allows the junction terminal 5 to enter only when the junction terminal 5 is inserted in a predetermined position, i.e. the correct position.

Figure 3:
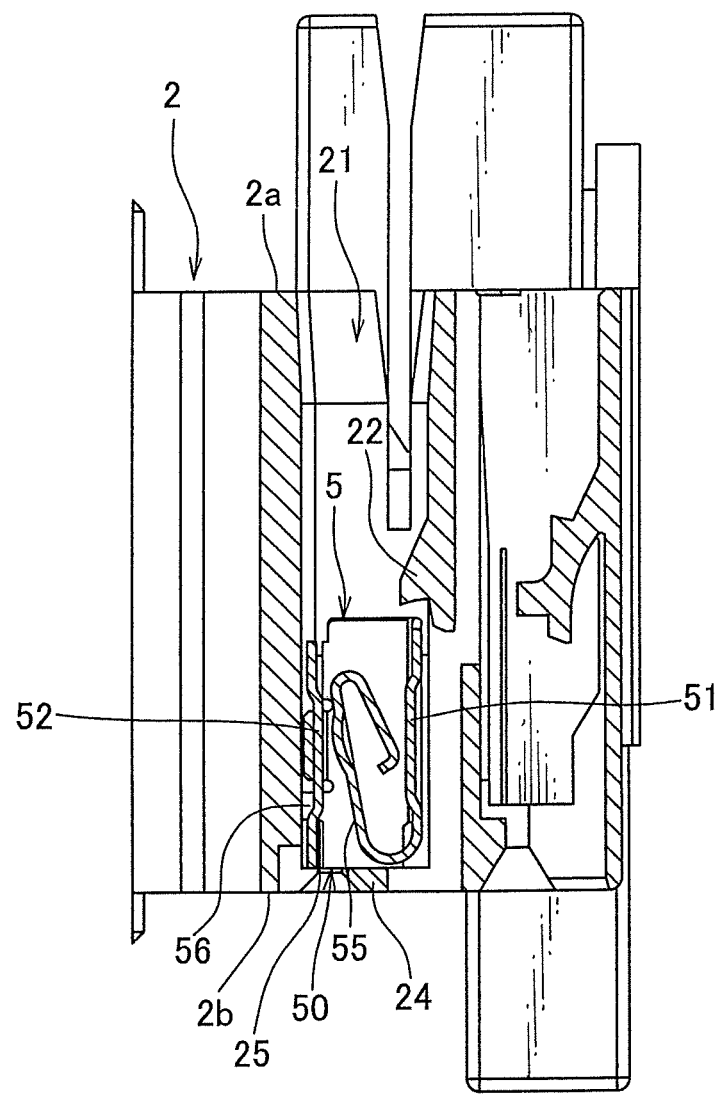
FIG. 3 is a cross-sectional view taken along a line A-A of a frame shown in FIG. 2 and a junction terminal inserted into the frame.
Figure 5:
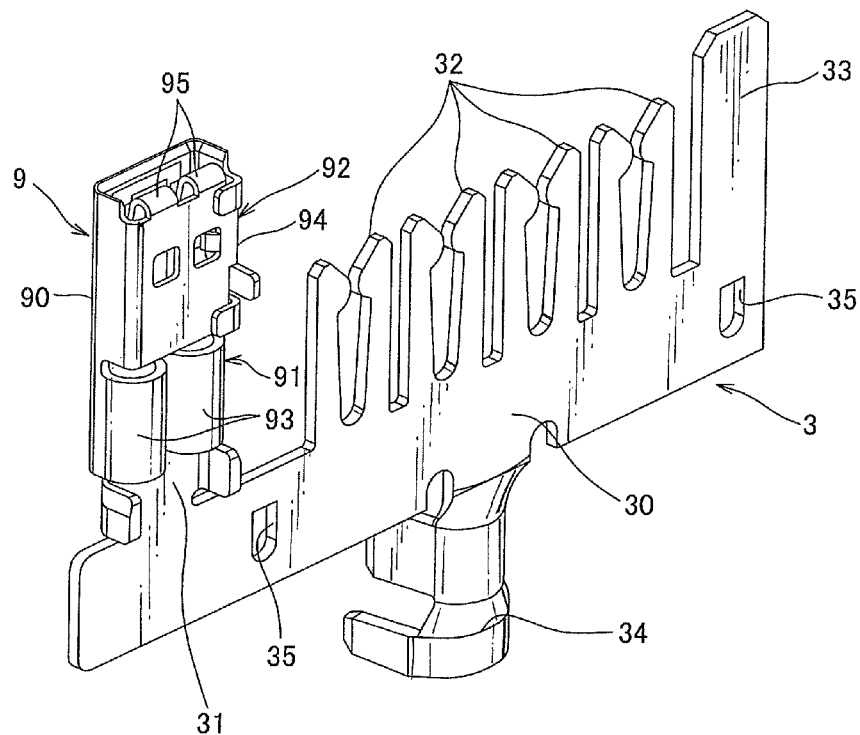
FIG. 5 is a perspective view of a bus bar and a junction terminal used in a conventional electrical junction box.
Figure 6:
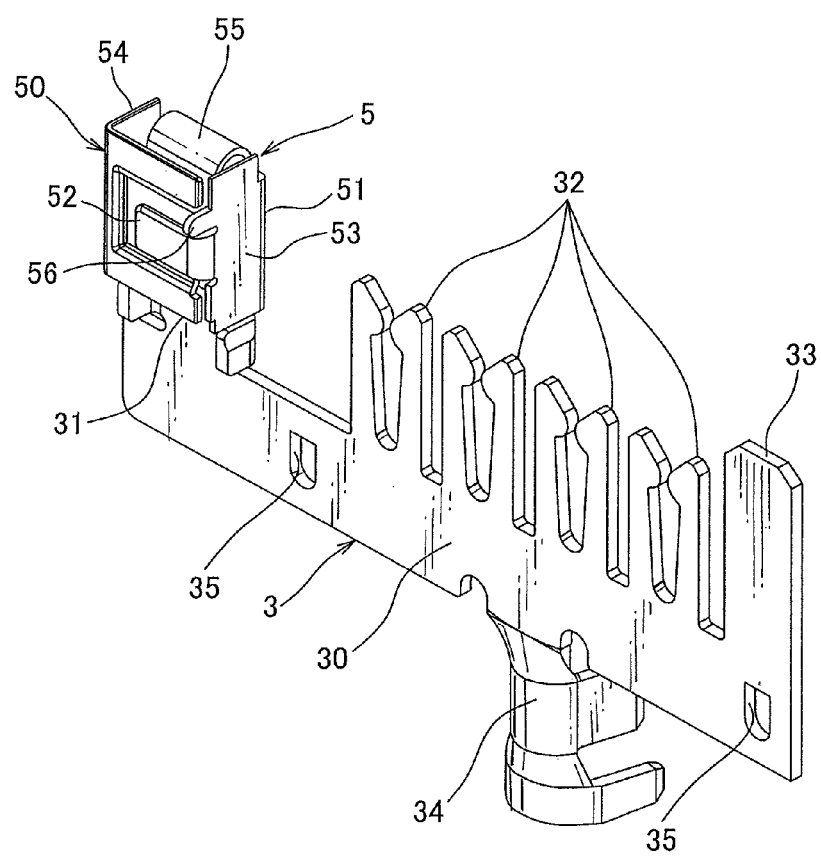
FIG. 6 is a perspective view showing a state in which another junction terminal is attached to the bus bar shown in FIG. 5.
Figure 7:
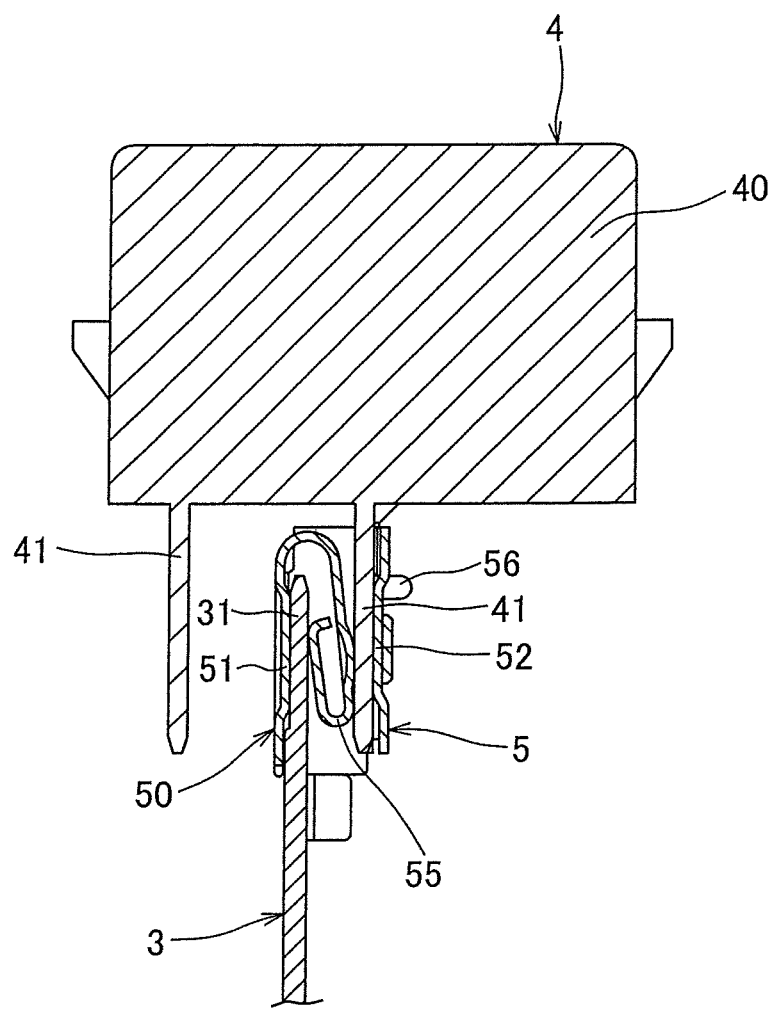
FIG. 7 is a cross-sectional view showing a state in which a plate-like terminal portion of an electronic component is connected to the junction terminal shown in FIG. 6.
Figure 8:
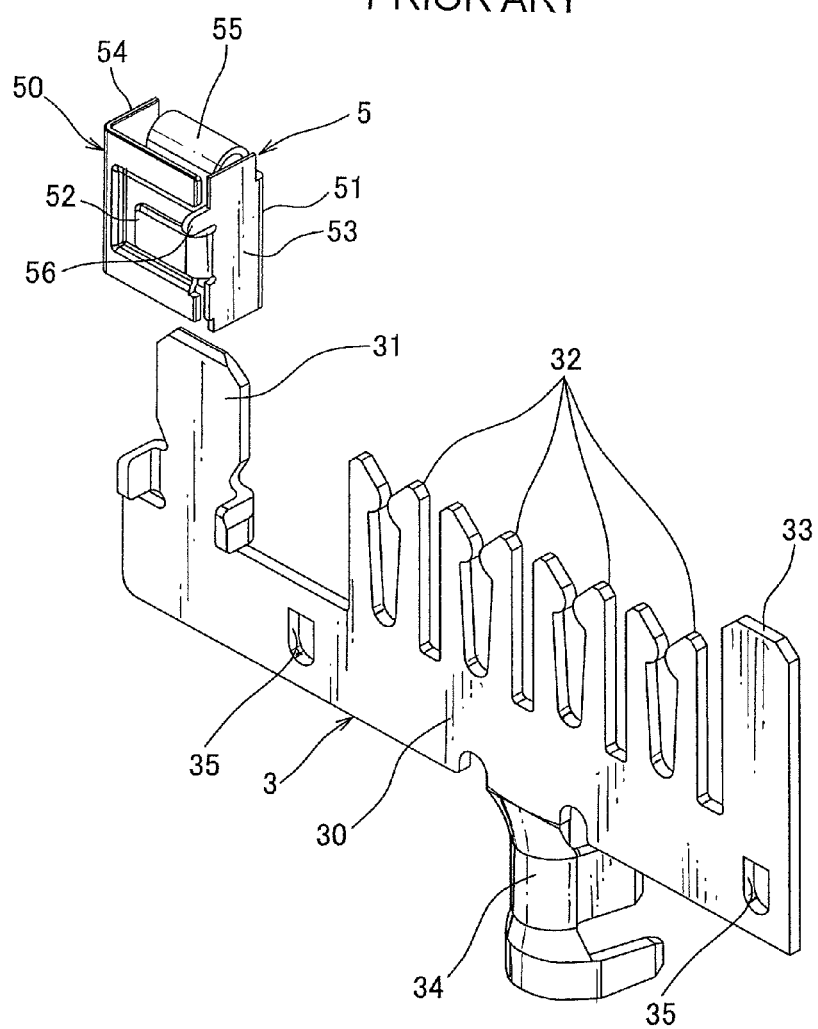
FIG. 8 illustrates possible problem of using the junction terminal shown in FIG. 6 and shows the junction terminal being attached to the bus bar in a correct position.

In the following, an example of a method for assembling the electrical junction box 1 is explained. Firstly, as shown in FIG. 2, the relay terminal 5 alone is inserted into the receiving portion 21 from the side of the lower face 2a. At this time, the junction terminal 5 can only be inserted into the receiving portion 21 in one, predetermined position. Thus, there is no possibility that the junction terminal 5 is inserted in the wrong position. As shown in FIG. 3, when the junction terminal 5 is inserted into the receiving portion 21, an upper end of the junction terminal 5 abuts on the upper wall 24, and a lower end of the junction terminal 5 engages with the engagement lance 22, thereby holding the junction terminal 5 in the receiving portion 21.

Next, as shown in FIG. 2, the bus bar 3 is inserted into the receiving portion 21 from the side of the lower face 2a. When the bus bar 3 is inserted into the receiving portion 21, the plate-like terminal portion 31 is inserted into the tubular portion 50 of the junction terminal 5. Here, the bus bar 3 is inserted into the receiving portion 21 with an end of the electric wire being connected to an electric wire crimp portion 34; however, the electric wire is not shown in the drawings.

Next, the electronic component such as the relay 4 is attached to the component attachment portion on the side of the upper face 2b. When the relay 4 is attached to the component attachment portion, the plate-like terminal portion 41 is inserted into the tubular portion 50 of the junction terminal 5. In such manner, the electrical junction box 1 is assembled.

According to the electrical junction box 1 described above, the junction terminal 5 is arranged to bias or push the plate-like terminal portion 31 of the bus bar 3 and the plate-like terminal portion 41 of the electronic component 4 with one spring portion 55. Thus, the height dimension of the frame 2 can be reduced. Furthermore, since the frame 2 includes the engagement lance 22, the junction terminal 5 alone can be inserted into the receiving portion 21 in advance. During this insertion, the preventive projection 56 and the preventive groove 23 prevent the junction terminal 5 from being inserted into the receiving portion 21 in the wrong position. Although it is possible to insert the junction terminal 5 together with the bus bar 3 attached to the junction terminal 5 into the receiving portion 21, this is not efficient, because, as described before, the junction terminal 5 may possibly be detached from the bus bar 3 before being inserted into the receiving portion 21, or the junction terminal 5 may possibly be attached to the bus bar 3 in the wrong way.

As described above, according to the present invention, there is provided the electrical junction box 1 which can reduce the height dimension of the frame 2, which can prevent the junction terminal 5 and the bus bar 3 from being assembled in the wrong way, and which can enhance the assembling of the electrical junction box 1.

The embodiments described herein are only representative embodiments of the present invention, and the present invention is not limited to these. That is, the present invention can be modified and implemented in various ways without departing from the gist of the present invention.

REFERENCE SIGN LIST 1 electrical junction box
2 frame
3 bus bar
4 relay (electrical component)
5 junction terminal
21 receiving portion
22 engagement lance
31, 41 plate-like terminal portion
50 tubular portion
51, 52 opposing wall
55 spring portion

The invention claimed is:

1. An electrical junction box comprising:
a frame;
a bus bar and an electronic component to be attached to the frame; and
a junction terminal interconnecting a plate-like terminal portion of the bus bar and a plate-like terminal portion of the electronic component,
wherein the junction terminal includes a tubular portion having a pair of opposing walls and a spring portion arranged in the tubular portion, wherein the spring portion is arranged such that the plate-like terminal portion of the bus bar inserted into the tubular portion from one side is sandwiched between the spring portion and one of the opposing walls and that the plate-like terminal portion of the electronic component inserted into the tubular portion from the other side is sandwiched between the spring portion and the other one of the opposing walls, and wherein the frame includes a receiving portion and an engagement portion arranged to hold the junction terminal inserted into the receiving portion.

2. The electrical junction box according to claim 1, wherein the electrical junction box is assembled by inserting the junction terminal alone into the receiving portion, and then attaching the bus bar and the electronic component to the frame, and inserting the plate-like terminal portion of the bus bar and the plate-like terminal portion of the electronic component into the tubular portion.

3. The electrical junction box according to claim 2, wherein the receiving portion allows the junction terminal to enter only when the junction terminal is inserted in a predetermined position.

4. The electrical junction box according to claim 3, wherein the junction terminal is provided with a preventive projection for preventing wrong insertion which projects from an outer surface of the tubular portion, and the receiving portion is provided with a preventive groove for preventing wrong insertion which positions the preventive projection.

5. The electrical junction box according to claim 1, wherein the receiving portion allows the junction terminal to enter only when the junction terminal is inserted in a predetermined position.

6. The electrical junction box according to claim 5, wherein the junction terminal is provided with a preventive projection for preventing wrong insertion which projects from an outer surface of the tubular portion, and the receiving portion is provided with a preventive groove for preventing wrong insertion which positions the preventive projection.

\* \* \* \* \*